(12) United States Patent
Zheng et al.

(10) Patent No.: US 9,357,480 B2
(45) Date of Patent: *May 31, 2016

(54) METHOD FOR SELECTING A NETWORK BY A TERMINAL AND DUAL-STANDBY TERMINAL

(71) Applicant: HUAWEI TECHNOLOGIES CO., LTD., Shenzhen (CN)

(72) Inventors: Xiaochun Zheng, Shenzhen (CN); Maolong Jiang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 309 days.

This patent is subject to a terminal disclaimer.

(21) Appl. No.: 13/948,410

(22) Filed: Jul. 23, 2013

(65) Prior Publication Data

US 2013/0310031 A1     Nov. 21, 2013

Related U.S. Application Data

(63) Continuation of application No. 13/495,791, filed on Jun. 13, 2012, now Pat. No. 8,798,625, which is a continuation of application No. PCT/CN2011/080555, filed on Oct. 8, 2011.

(30) Foreign Application Priority Data

Jan. 18, 2011   (CN) .......................... 2011 1 0020528

(51) Int. Cl.
*H04W 48/18*   (2009.01)
*H04W 88/06*   (2009.01)

(52) U.S. Cl.
CPC .............. *H04W 48/18* (2013.01); *H04W 88/06* (2013.01); *Y02B 60/50* (2013.01)

(58) Field of Classification Search
CPC ....... H04W 48/18; H04W 88/06; Y02B 60/50

USPC ........ 455/432.1–444; 370/331–338, 352–356
See application file for complete search history.

(56) References Cited

U.S. PATENT DOCUMENTS 6,212,390 B1    4/2001   Rune
6,714,781 B2    3/2004   Pecen et al.
(Continued)

FOREIGN PATENT DOCUMENTS

CN    1675949    9/2005
CN    1780476    5/2006
(Continued)

OTHER PUBLICATIONS

Office Action, dated Dec. 27, 2013, in corresponding Chinese Application No. 201110020528.1 (8 pp.).
(Continued)

*Primary Examiner* — Sharad Rampuria
(74) *Attorney, Agent, or Firm* — Staas & Halsey LLP

(57) ABSTRACT

Embodiments provide a method for selecting a network by a terminal and a dual-standby terminal. The method includes: enabling, by a first network processing module, a circuit switched (CS) domain to preferably camp on a first network, and executing a CS domain service; enabling, by a second network processing module, a packet switched (PS) domain to preferably camp on a second network, and executing a PS domain service; wherein, signal quality of the first network is better than that of the second network, and a data transmission rate of the second network is higher than that of the first network; and closing the second network processing module when no PS domain service exists in a set duration. These embodiments help improve the service quality and reduce power consumption of the terminal.

20 Claims, 6 Drawing Sheets

(56) References Cited

U.S. PATENT DOCUMENTS

| | | |
|---|---|---|
| 7,274,935 B2 | 9/2007 | Balachandran et al. |
| 7,359,347 B2 | 4/2008 | Ahmavaara et al. |
| 7,420,964 B2 | 9/2008 | Narvanen et al. |
| 7,522,585 B2 | 4/2009 | Liu et al. |
| 7,623,885 B2 | 11/2009 | Vaittinen et al. |
| 7,983,711 B2 | 7/2011 | Juneja et al. |
| 7,995,562 B2 | 8/2011 | Purnadi et al. |
| 8,078,166 B2 | 12/2011 | Thiebaut et al. |
| 8,078,178 B2 | 12/2011 | Islam et al. |
| 8,107,435 B1* | 1/2012 | Singh .................... H04W 36/30 370/331 |
| 8,380,211 B2 | 2/2013 | Duan et al. |
| 2003/0169725 A1* | 9/2003 | Ahmavaara et al. .......... 370/352 |
| 2004/0198302 A1 | 10/2004 | Hutchinson et al. |
| 2007/0165600 A1 | 7/2007 | Fauconnier et al. |
| 2008/0051130 A1 | 2/2008 | Juneja et al. |
| 2012/0147850 A1* | 6/2012 | Zheng .................... H04W 48/16 370/331 |
| 2013/0089039 A1* | 4/2013 | Vashi .................... H04W 72/02 370/329 |
| 2013/0150032 A1* | 6/2013 | Pattaswamy ...... H04W 52/0229 455/434 |
| 2013/0244666 A1* | 9/2013 | Carmon ............ H04W 52/0261 455/438 |
| 2014/0003259 A1* | 1/2014 | Chin ................. H04W 52/0245 370/252 |
| 2015/0036514 A1* | 2/2015 | Zhu ..................... H04W 52/244 370/252 |
| 2015/0223203 A1* | 8/2015 | Lindner ................ H04W 72/02 455/452.1 |
| 2015/0327125 A1* | 11/2015 | Lindoff ................. H04W 48/18 455/437 |

FOREIGN PATENT DOCUMENTS

| | | |
|---|---|---|
| CN | 100389633 | 5/2008 |
| CN | 101179783 | 5/2008 |
| CN | 101902793 | 12/2010 |
| CN | 101945502 | 1/2011 |

OTHER PUBLICATIONS

Search Report and Written Opinion issued in corresponding PCT Application No. PCT/CN2011/080555, dated Feb. 16, 2012, and an English translation thereof, total 15 pages.

Office Action issued in corresponding Chinese Application No. 201110020528.1, dated Apr. 28, 2013, and an English translation thereof, total 13 pages.

Notice of Allowance, dated Apr. 26, 2013, in corresponding U.S. Appl. No. 13/495,791.

* cited by examiner

METHOD FOR SELECTING A NETWORK BY A TERMINAL AND DUAL-STANDBY TERMINAL

CROSS-REFERENCE TO RELATED APPLICATIONS

This application is a continuation of U.S. patent application Ser. No. 13/495,791, filed on Jun. 13, 2012, which is a continuation of International Application No. PCT/CN2011/080555, filed on Oct. 8, 2011. The International Application claims priority to Chinese Patent Application No. 201110020528.1, filed on Jan. 18, 2011. The afore-mentioned patent applications are hereby incorporated by reference in their entireties.

FIELD OF THE INVENTION

The present invention relates to a communications technology field, and in particular, to a dual-standby terminal and a method for selecting a network by the terminal.

BACKGROUND

In the radio communication technology field, a plurality of networks exist, for example, the second-generation communication (2G, Second Generation), third-generation communication (3G Third Generation), and long term evolution (LTE, Long Term Evolution) networks. Services based on the different networks include voice services and data services. Voice services are borne by the circuit switched domain (CS, Circuit Switched Domain), and are called CS domain services for short. Data services are borne by the packet switched domain (PS, Packet Switched Domain), and are called PS domain services for short.

The coverage of certain newly emerging networks among the preceding networks is not mature, and there may be no signal in these networks during actual use, affecting user experience. The following takes the 2G and 3G networks for example. Because the 3G network is an newly emerging network and is less mature than the 2G network, signal coverage of the 3G network is not so good as the 2G network. To improve user experience, terminals (such as 3G handsets) on existing 3G networks support 2G networks to help the terminals reselect 2G networks when the signals of 3G networks are weak. The terminals that support both 2G and 3G networks are called dual-mode terminals (typical dual-mode terminals include WCDMA/GSM dual-mode handsets and TD-SCDMA/GSM dual-mode handsets).

FIG. 1 is a structural schematic diagram of a common dual-mode terminal in the prior art. For easy description, the following lists only a plurality of major function modules, including:

a SIM card, a SIM card proxy module, an application, a service adaptation module, a 2G/3G protocol stack processing module, a 2G/3G physical layer processing module, a 2G/3G radio frequency processing module, and an antenna, where:

the SIM card is configured to store certain information of a user, including information indicating that the user is on a 2G network and a 3G network, for example, the SIM card can be a USIM card that is frequently used on the 3G network;

the SIM card proxy module is configured to perform a proxy service when the 2G/3G protocol stack processing module accesses the SIM card so that the 2G/3G protocol stack processing module can access the corresponding 2G or 3G user information in the SIM card on the 2G and 3G networks;

the application refers to applications related to services or control in the terminal;

the service adaptation module is configured to connect the application and 2G//3G protocol stack processing module, and select a proper protocol stack for transmitting services according to the camp state of the 2G/3G protocol stack;

the 2G/3G protocol stack processing module is configured to process 2G and 3G related protocols, where the protocols refer to protocols above the physical layer, for example, MAC, RLC, and RRC;

the 2G/3G physical layer processing module is configured to process protocols related to the 2G and 3G physical layers;

the 2G/3G radio frequency processing module is configured to perform processing functions related to 2G and 3G radio frequency modules; and the antenna receives and transmits 2G and 3G signals.

A single-card dual-mode terminal with the preceding structure preferably camps on a 3G network, and processes CS domain and PS domain services on the 3G network through modules such as 2G/3G protocol stack processing module, 2G/3G physical layer processing module, and 2G/3G radio frequency processing module.

When developing the present invention, the inventor finds at least the following disadvantages of the prior art:

When an existing single-card dual-mode terminal on a network reselects another network, a period in which services are unreachable exists. During this period, services are interrupted, and CS domain services and PS domain services cannot be performed, thereby affecting user experience.

SUMMARY OF THE INVENTION

Embodiments of the present invention provide a dual-standby terminal and a method for selecting a network by a terminal to improve service quality, and reduce the power consumption of the terminal.

An embodiment of the present invention provides a method for selecting a network by a terminal, including:

enabling, by a first network processing module, a circuit switched (CS) domain to preferably camp on a first network, and executing a CS domain service;

enabling, by a second network processing module, a packet switched (PS) domain to preferably camp on a second network, and executing a PS domain service;

where, signal quality of the first network is better than that of the second network, and a data transmission rate of the second network is higher than that of the first network; and closing the second network processing module when no PS domain service exists in a set duration.

An embodiment of the present invention provides a dual-standby terminal, including:

a first network processing module, a second network processing module, and a control module; where, the first network processing module is configured to enable the circuit switched (CS) domain to preferably camp the first network, and execute the CS domain service;

the second network processing module is configured to enable the packet switched (PS) domain to preferably camp on the second network, and execute the PS domain service;

where, signal coverage of the first network is better than that of the second network, and the data transmission rate of the second network is higher than that of the first network;

the control module is configured to close the second network processing module when no PS domain service exists in the set duration.

In embodiments of the present invention, two modules are used to process the CS domain service and PS domain service respectively, and enable the CS domain to preferably camp on the first network. As the CS domain mainly includes voice services (for example making a call), the CS domain is more sensitive to the case in which services are unreachable. If a user cannot make a call in a period, the user experience may be greatly affected. Therefore, this embodiment enables the CS domain to preferably camp on the first network (the signal coverage of the first network is better than that of the second network) and can improve the user experience in CS domain services (such as voice services). In addition, the PS domain service is enabled to preferably camp on the second network with a high data transmission rate, allowing the user to enjoy high-speed data services. Meanwhile, the embodiment of the present invention closes the second network processing module when no PS domain service exists in a set duration, achieving the effect of saving energy.

DETAILED DESCRIPTION

To make the purpose and advantages of the present invention clear, the following further describes the present invention with the accompany drawings and embodiments.

Embodiment 1

Figure 1:
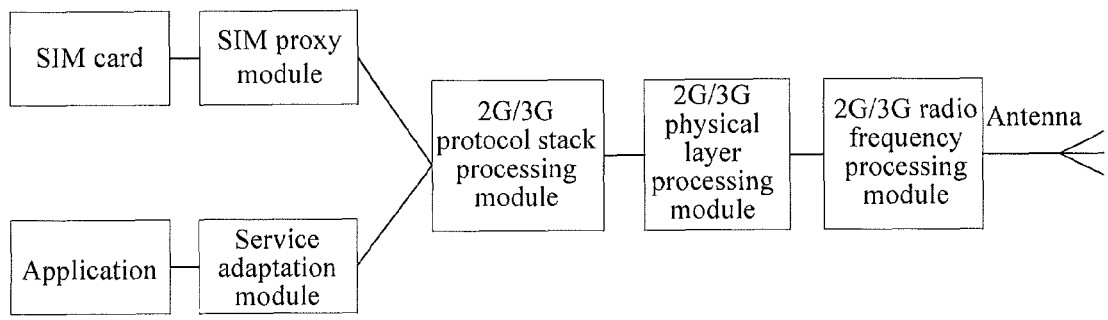
FIG. 1 is a structural schematic diagram of a terminal according to the prior art.
Figure 2:
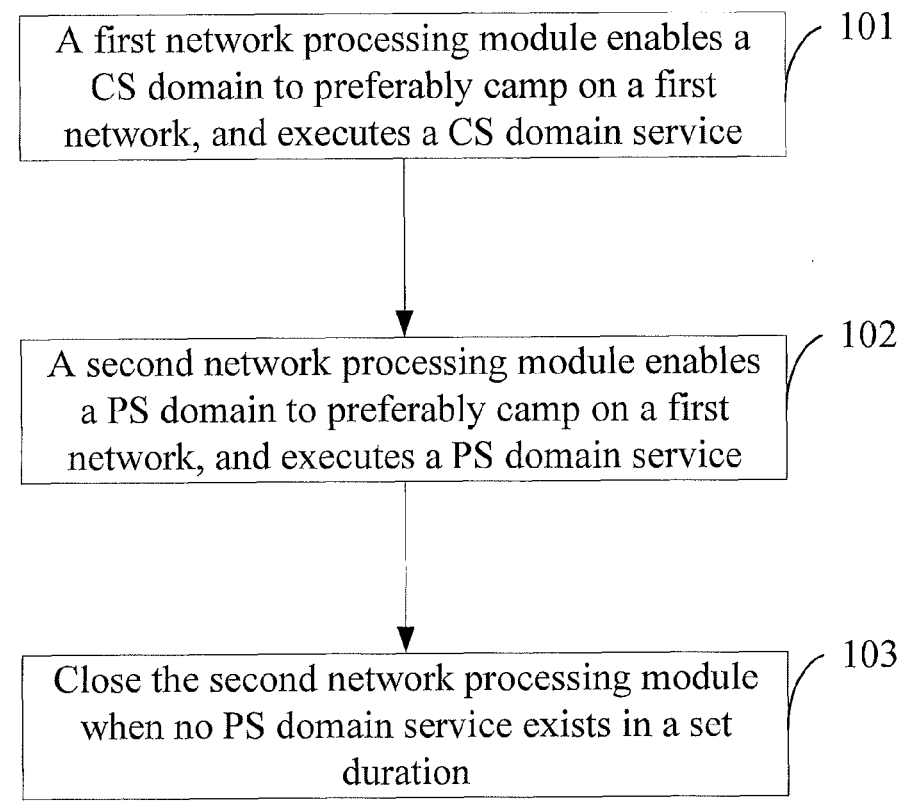
FIG. 2 is a flowchart of a method for selecting a network by a terminal provided in a first embodiment of the present invention.

An embodiment of the present invention provides a network reselection method. As shown in FIG. 2, the method includes the following steps:

Step 101: A first network processing module enables a CS domain to preferably camp on a first network, and executes a CS domain service.

Step 102: A second network processing module enables a PS domain to preferably camp on a second network, and executes a PS domain service.

Signal coverage of the first network is better than that of the second network, and the data transmission rate of the second network is higher than that of the first network.

Step 103: Close the second network processing module when no PS domain service exists in a set duration.

In the present invention, "enabling the CS domain to camp on the 2G network" can be understood as follows: A terminal initiates a location area update (LAU, Location Area Update) process to attach to the 2G network; "enabling the PS domain to camp on the 3G network" can be understood as follows: The terminal initiates a general packet radio service (GPRS) attach or route area update (RAU, Route Area Update) process to make it attach to the 3G network. Those skilled in the art can enable the CS domain to camp to the 2G network or the PS domain to camp on the 3G network according to the present embodiment and prior art. The process is not repeated here.

In the present embodiment, "closing the second network processing module" means to make the second network processing module not to interact with a network, including listening to system broadcast messages, and to close the radio frequency part corresponding to the second network processing module to achieve energy-saving effect.

It can be seen that in this embodiment of the present invention, two modules are used to process the CS domain service and PS domain service, and the CS domain is enabled to preferably camp on the first network. Because the CS domain mainly includes voice services (for example, making a call), the CS domain is more sensitive to the case in which services are unreachable. If a user cannot make a call in a period, user experience may be greatly affected. Therefore, this embodiment enables the CS domain to preferably camp on the first network (the signal coverage of the first network is better than that of the second network) and can improve the user experience in CS domain services (such as voice services). In addition, a PS domain service is enabled to preferably camp on the second network with a high data transmission rate, allowing the user to enjoy high-speed data services.

In addition, during the development of the present invention, the following scenario is considered: A PS domain service is not always executed in many cases. For example, some users who use dual-mode terminals may need only CS domain services, such as making calls and sending short messages, but do not need PS domain services such as Internet access; or many users generally do not need the PS domain services at night when sleeping. Out of consideration for the preceding scenario, the embodiment of the present invention closes the second network processing module when no PS domain service exists in a set duration, achieving the effect of saving energy. "the set duration" is not fixed. Those skilled in the art can set a proper value according to actual situations (depending on users and user habits), or users can configure and select the duration (for example, by adding an option of selecting the "duration" on a terminal setting interface).

The first network may be a 2G network (such as a GSM network). When the first network is a 2G network, the second network may be a 3G or 4G network (such as WCDMA, TD-SCDMA, or LTE); or the first network may be a 3G network, in such case, the second network may be a 4G network (such as an LTE network) or a future new generation network. If the new generation network supports PS and CS domain services, and the signal coverage is poorer than an existing network, the solution provided in this embodiment may also be applied to such network to improve service quality and save energy.

Further, this embodiment may further include processing of the following two cases:

1) Processing when another PS domain service is initiated after the second network processing module is closed, and 2) Processing when the condition for "performing RAU in preset conditions" is met The processing of each of the two cases can separately combine with the solution provided in steps 101 to 103. To achieve a better effect, the processing of both the two cases can be included in actual applications.

To be specific:

For the case 1), if another PS domain service is initiated after the second network processing module is closed, the second network processing module is started when the PS domain service is initiated;

It is determined whether the second network processing module finds a second network cell that meets a camping requirement; if yes, when the route area of the second network is changed, the second network processing module is triggered to initiate the RAU process, to enable the PS domain to camp on the found second network cell, and to execute the PS domain service; when the route area of the second network is not changed, the second network processing module is triggered to execute the PS domain service.

When it is determined that the second network processing module does not find the second network cell that meets the camping requirement, the first network networking processing module is triggered to enable the PS domain to camp on the first network cell on which a current CS domain service camps, and to execute the PS domain service.

For the case 2), when the preset condition for performing the RAU process is met, this embodiment starts the second network processing module; where, "preset condition for performing the RAU process" includes: a preset periodical RAU timer expires, or the first network processing module initiates the LAU process when determining that the location area of the first network is changed.

It is determined whether the second network processing module finds a second network cell that meets the camping requirement; if yes, when the route area of the second network is changed, or the preset condition for performing the RAU process is that the periodical RAU timer expires and the condition is met, the second network processing module is triggered to perform the RAU process, enable the PS domain to camp on the found second network cell, and close the first network processing module; when the route area of the second network is not changed, or the preset condition for performing the RAU process is that the periodical RAU timer expires and the condition is not met, the second network processing module is closed.

When it is determined that the second network processing module does not find the second network cell that meets the camping requirement, the first network networking processing module is triggered to enable the PS domain to camp on the first network cell on which the current CS domain service camps, and the second network processing module is closed.

In the case 2), through periodical interaction with the network side, it can be guaranteed that the terminal is not separated from the network; in addition, accuracy of the route area information is kept as possible as it can be.

In the processing of the two cases:

"the route area of the second network is changed" is as follows: the route area of the found second network cell is not consistent with the route area where the second network cell is located, in which, the second network cell is a cell on which the PS domain camps before the second network processing module is closed; and, "the route area of the second network is not changed" is as follows: the route area of the found second network cell is consistent with the route area where the second network cell is located, in which, the second network cell is a cell on which the PS domain camps before the second network processing module is closed.

In the processing of the two cases, the search performed by the second network processing module is based on the list of neighboring cells on the second network, in which the list is configured in the first network cell; where, before the second network processing module is started, the following is included:

the first network processing module is triggered to detect whether the dual-standby terminal moves to the first network cell that is not configured with neighboring cells on the second network; if yes, the PS domain is enabled to camp on the first network cell where the current dual-mode terminal is located, and the process ends; otherwise, the step of starting the second network processing module continues to be executed.

In this embodiment, when the first network is a GSM network, and the second network is a 3G network, no PS domain service existing in the set duration includes:

after the PS domain is camped on or the route area of the second network is updated, no packet data protocol (PDP) activation process is performed in the set duration;

or, after PDP deactivation, no PDP activation process is performed in the set duration.

It should be noted that this embodiment provides the method for determining whether data services exist only on a GSM network and a 3G network. Those skilled in the art can determine whether data services exist according to this embodiment and features of the packets and protocols in the data services on other networks (such as 4G and future new networks).

Embodiment 2

This embodiment takes the case in which the first network is a GSM network and the second network is a TD-SCDMA (hereinafter referred to as TD for short) network as an example to describe the present invention based on Embodiment 1.

In this embodiment, the dual-mode terminal includes two independent modules: a GSM processing module (the first network processing module) and a TD processing module (the second network processing module). It should be noted that the GSM processing module and the TD processing module here are mainly used to indicate two modules that execute GSM and TD related protocols respectively. "Independent" only means that the modules are independent in mainly processing functions (for processing two types of service at the protocol layer). It can be understood that in actual applications, the two modules are not completely "independent", that is, they can transfer or share certain information through certain functions or middle units.

Figure 3:
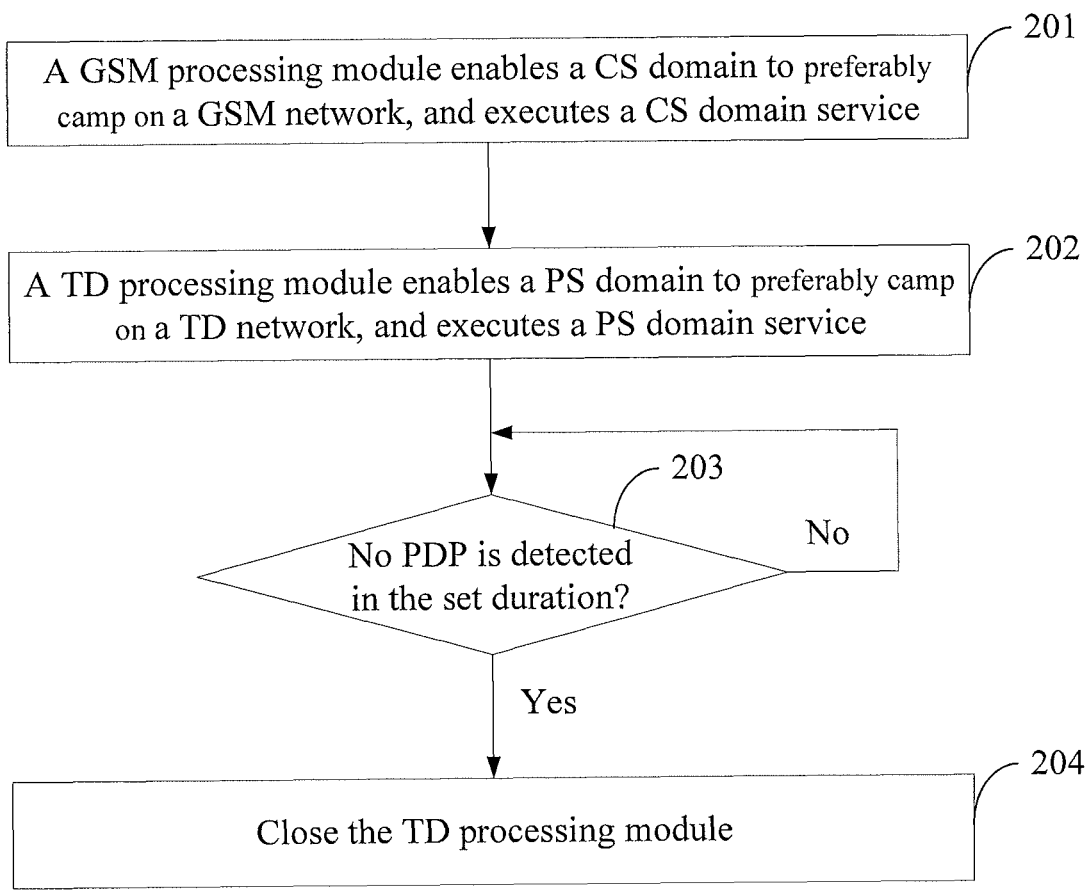
FIG. 3 is a flowchart of a method for saving energy by a dual-standby terminal provided in a second embodiment of the present invention.

As shown in FIG. 3, the method provided in this embodiment includes the following steps:

Step 201: The GSM processing module enables a CS domain to preferably camp on the GSM network, and executes a CS domain service.

Step 202: The TD processing module enables a PS domain to preferably camp on the TD network, and executes a PS domain service.

The order of executing the two steps is not limited. The two modules can be started during power-on or restart of a terminal according to a certain policy to complete the two steps so that the terminal can use the two modules to execute two types of service at the same time in normal working state, allowing the PS domain and CS domain to camp on the two networks. Therefore, such a terminal that camps on two networks is called "dual-mode dual-standby terminal".

Step 203: Determine whether no packet data protocol (PDP, Packet Data Protocol) context is detected in the set duration; if yes, go to step 204; otherwise, continue to execute step 203.

Because the existing 3G network does not support a network activation function, a service is initiated only from the terminal. Therefore, no packet data protocol (PDP, Packet Data Protocol) context means no PS domain service, and PS paging does not need to be listened to; based on the features of the TD-SCDMA network (which is a 3G network), whether PS domain services exist can be detected indirectly by detecting whether PDP context exists.

During specific implementation, a timer may be set. After PS domain attach is performed or the route area of the TD-SCDMA network is updated, the timer is started. When no PDP activation process is performed within specified time, it is determined that no PDP context is detected in the set duration. In this case, the TD processing module can be closed; or, after PDP deactivation, the timer is started. When no PDP activation process is performed within the specified time, it is determined that no PDP context is detected in the set duration. Regardless of the determination method, the preceding timer is closed as long as the PDP context is activated.

Step 204: Close the TD processing module.

Through the preceding steps 201 to 204, the case in which the CS domain often reselects networks can be avoided, the user experience can be improved, and power consumption of the dual-mode dual-standby terminal can be reduced.

Figure 4:
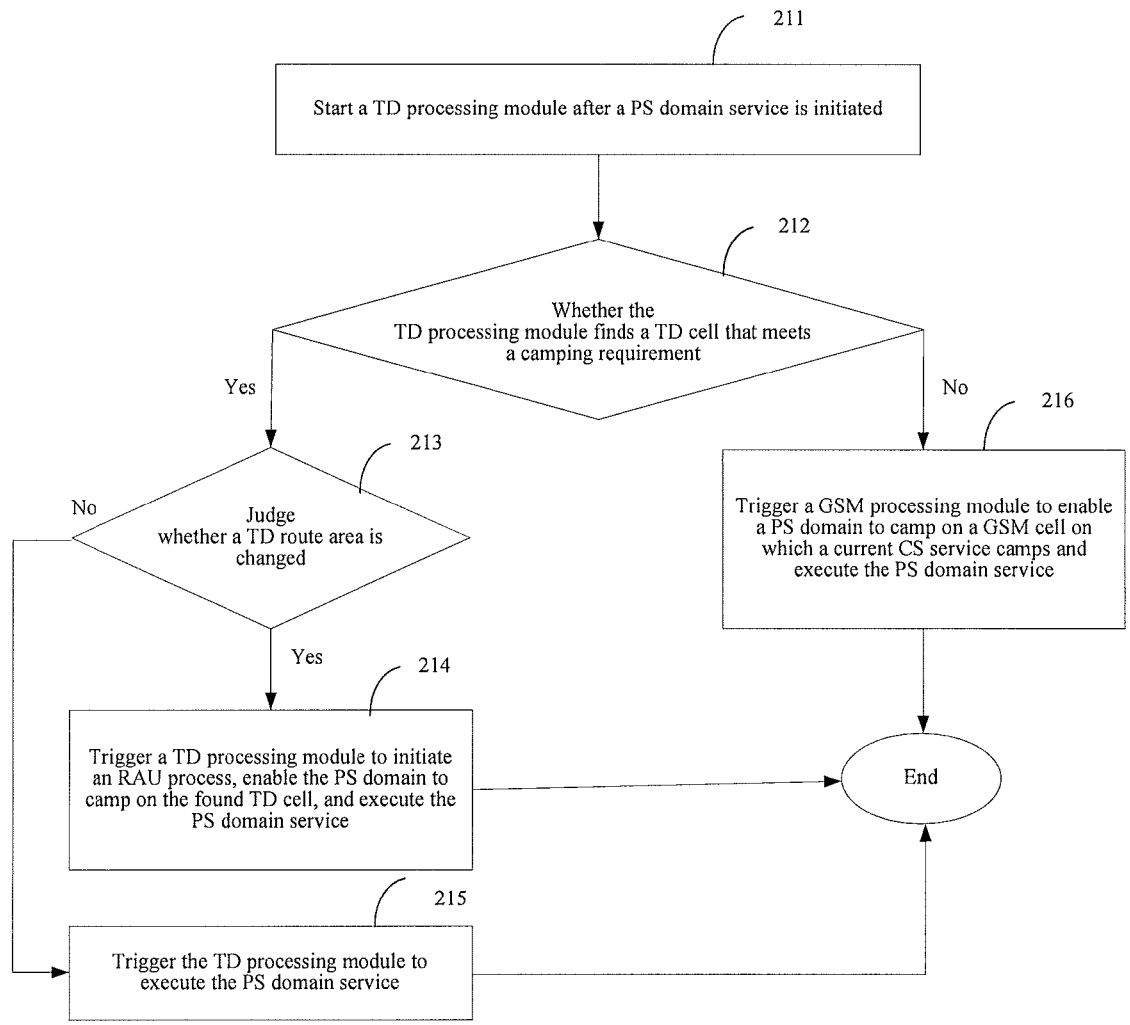
FIG. 4 is a flowchart of executing a PS domain service when a TD processing module is closed provided in the second embodiment of the present invention.

FIG. 4 is a flowchart of executing a PS domain service when the TD processing module is closed. The process includes the following steps:

Step 211: Start the TD processing module after the PS domain service is initiated.

The PS domain service can be initiated by an application. When an application initiates the PS domain service, the TD processing module is started through a control unit.

Step 212: Determine whether the TD processing module finds a TD cell that meets camping requirement; if yes, go to step 213; otherwise, go to step 216.

In this step, the TD processing module searches the TD neighboring cell list configured in a GSM cell. When determining whether the signal quality of the found TD cell meets the camping requirement, the TD processing module needs to consider factors such as signal quality and status of the found TD cell.

Step 213: Determine whether the TD route area is changed; if yes, go to step 214; otherwise, go to step 215.

In this step, if the route area of the found TD cell is different from the route area of the TD cell on which the PS domain camps before the TD processing module is closed, the TD route area is changed; otherwise, the TD route area is not changed.

Step 214: Trigger the TD processing module to initiate an RAU process, enable the
PS domain to camp on the found TD cell and execute the PS domain service, and end the process.

Step 215: Trigger the TD processing module to execute the PS domain service, and end the process.

Step 216: Trigger the GSM processing module to enable the PS domain to camp on the GSM cell on which a current CS domain service camps and execute the PS domain service, and end the process.

It can be seen that in the process of executing the PS domain service described in steps 211 to 216, if the TD route area is changed, the TD processing module needs to perform TD route area update through the RAU process, resulting in prolonging the time required for executing the PS domain service. To further improve the user experience, the possibility of performing the RAU process in the process of executing the PS domain service needs to be reduced as possible as it can be, thereby shortening the time for executing the PS domain service.

In this embodiment, after the TD processing module is closed, the RAU process can be performed periodically or irregularly according to the preset condition for performing the RAU process. FIG. 4 is a flowchart of performing the RAU process when the TD processing module is closed. The process includes the following steps:

Step 221: Start the TD processing module when the preset condition for performing the RAU process is met.

In this step, the preset condition for performing the RAU process can be that the preset periodical RAU timer expires, or that an LAU process is performed when the GSM processing module determines that the GSM location area is changed.

Step 222: Determine whether the TD processing module finds a TD cell that meets a camping requirement; if yes, go to step 223; otherwise, go to step 226.

In this step, the TD processing module searches the TD neighboring cell list configured in the GSM cell for a TD cell that meets a camping requirement. The search method is the same as that in step 222.

Step 223: Determine whether the TD route area is changed or whether the condition met in step 221 is the periodical RAU timer expires; if yes, go to step 224; otherwise, go to step 226.

That is, in step 221, if the preset condition that "the periodical RAU timer expires" is met, go to step 224 after step 223; if in step 221, that the preset condition is met means that "the location area update process is performed when the GSM processing module determines that the GSM location area is changed", in step 223, determine whether the TD route area is changed.

Step 224: Trigger the TD processing module to perform the RAU process and enable the PS domain to camp on the found TD cell, and go to step 226.

Step 225: Trigger the GSM processing module to enable the PS domain to camp on the GSM cell on which the current CS domain service camps.

Step 226: Close the TD processing module.

Figure 5:
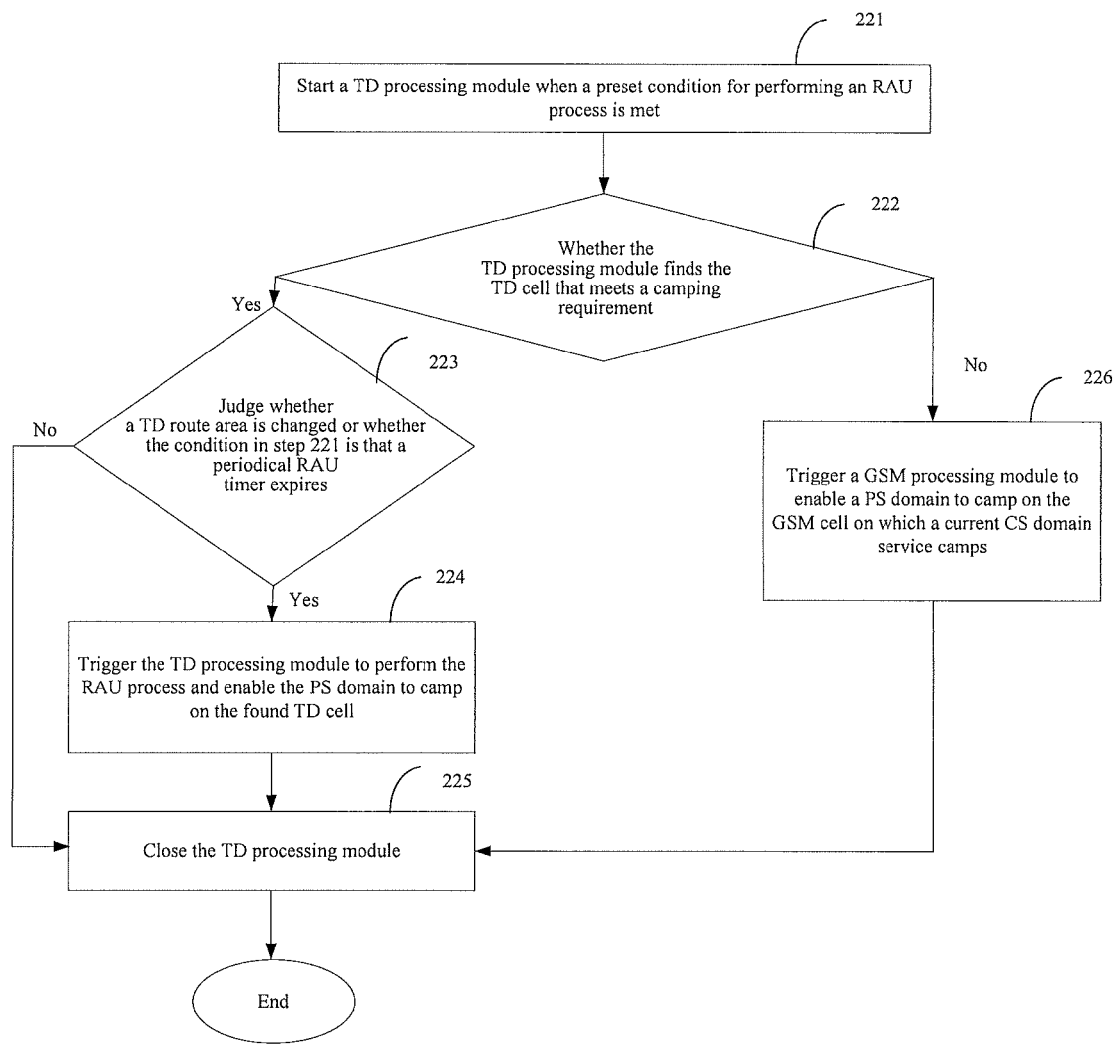
FIG. 5 is a flowchart of updating a route area when the TD processing module is closed provided in the second embodiment of the present invention.

It should be noted that, in the process shown in FIG. 5, although step 223 is already executed and step 224 is used to determine whether the TD route area is changed and RAU is performed in the case of change, if another PS domain service is initiated after the TD processing module is closed, the step of determining whether the TD area is changed still needs to be executed, and the RAU is performed in the case of change (refer to steps 213 and 214 in FIG. 4). This is because under the prerequisite that the TD module is closed, when the route area is changed, the scenario in which the preset condition for performing the RAU process is not met still exists and the TD route area information may fail to be updated timely. Therefore, when the PS domain service is initiated, step 213 as shown in FIG. 4 determines whether the TD route area is changed. If the step 214 is changed, it is necessary to initiate the RAU process.

In the process of executing the PS domain service, the TD processing module needs to search the TD neighboring cell list configured in the GSM cell. During the period when the TD processing module is closed, if the dual-standby terminal moves to a GSM cell that is not configured with the TD neighboring cell list, the TD processing module cannot find a TD cell that meets a camping requirement after start-up again. In this case, to further improve the effect of saving energy, and prevent the TD processing module from executing unnecessary operations, before step 212, the GSM processing module can be triggered to detect whether the dual-standby terminal moves to a GSM cell that is not configured with the TD neighboring cell list. If yes, the TD processing module is not started, but the PS domain is directly camped on the current GSM cell, the PS domain service is executed, and the process ends; otherwise, step 212 continues to be executed. Before step 222, the GSM processing module can be triggered to detect whether the dual-standby terminal moves to a GSM cell that is not configured with the TD neighboring cell list. If yes, the TD processing module is not started, but the PS domain is directly camped on the GSM cell on which the current CS domain service camps, and the process ends; otherwise, step 222 is executed.

Embodiment 3

An embodiment of the present invention further provides a dual-mode dual-standby terminal 30. The preceding first and second embodiments have introduced this terminal. The following embodiment describes this terminal explicitly.

Figure 6:
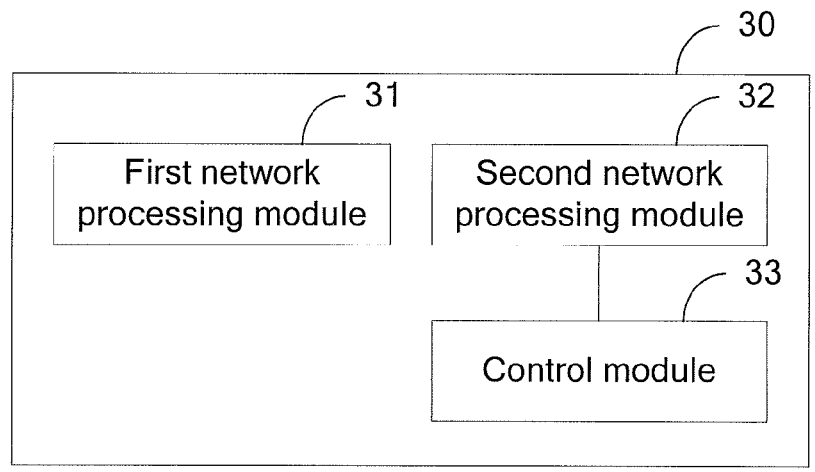
FIG. 6 is a structural schematic diagram of a dual-standby terminal provided in a third embodiment of the present invention.

Referring to FIG. 6, the terminal 30 includes:

a first network processing module 31, a second network processing module 32, and a control module 33; where, the first network processing module 31 is configured to enable a CS domain to preferably camp on a first network, and execute a CS domain service;

the second network processing module 32 is configured to enable a PS domain to preferably camp on a second network, and execute a PS domain service;

where, signal quality of the first network is better than that of the second network, and a data transmission rate of the second network is higher than that of the first network; and the control module 33 is configured to close the second network processing module when no PS domain service exists in a set duration.

Because multiple aspects, for example, a protocol layer, a physical layer, and radio frequency processing, are involved when the terminal processes signals, the first network processing module and second network processing module in the embodiment are for processing at the protocol layer. To facilitate description, the following describes the embodiment only from the aspect of the protocol layer, and the aspects of physical layer and radio frequency processing are not described.

In the embodiment, a control unit can be a unit beyond the protocol layer. The control unit can perform signal exchange with the second network processing module. For example, the control unit is configured to close the second network processing module when the second network processing module does not have a PS domain service in a duration. A plurality of methods can be adopted to determine whether the second network processing module has or does not have a PS domain service. For example, the second network processing module can periodically detect whether it has or does not have a PS domain service, and send a result at each time to the control module for the control module to confirm whether a PS domain service exists in a duration or not, or the control module can send a command for triggering the control module for detection to the second network processing module at a certain interval so that the second network processing module detects whether a PS domain service exists or not after receiving the command, and returns the result to the control module for the control module to determine whether a PS domain service exists in the duration or not.

Based on Embodiment 1 and Embodiment 2, in this embodiment, the control module is further configured to:

start the second network processing module after the PS domain service is initiated;

determine whether the second network processing module finds a second network cell that meets the camping requirement; if yes, when the route area of the second network is changed, trigger the second network processing module to initiate the RAU process, enable the PS domain to camp on the found second network cell, and execute the PS domain service; when the route area of the second network is not changed, trigger the second network processing module to execute the PS domain service; and when determining that the second network processing module does not find the second network cell that meets the camping requirement, trigger the first network networking processing module to enable the PS domain to camp on the first network cell on which the current CS domain service camps, and execute the PS domain service.

In addition, the control module is further configured to:

when the preset condition for performing the RAU process is met, start the second network processing module; where, the preset condition for performing the RAU process includes: a preset periodical RAU timer expires, or the first network processing module initiates the LAU process when determining that the location area of the first network is changed;

determine whether the second network processing module finds a second network cell that meets the camping requirement; if yes, when the route area of the second network is changed, or the preset condition for performing the RAU process is that the periodical RAU timer expires and the condition is met, trigger the second network processing module to perform the RAU process, enable the PS domain to camp on the found second network cell, and close the first network processing module; when the route area of the second network is not changed, or the preset condition for performing the RAU process is that the periodical RAU timer expires and the condition is not met, close the second network processing module; and when determining that the second network processing module does not find the second network cell that meets the camping requirement, trigger the first network networking processing module to enable the PS domain to camp on the first network cell on which the current CS domain service camps, and close the second network.

Search by the second network processing module mentioned in the preceding description, such as "determining whether the second network processing module finds the second network cell that meets the camping requirement", is performed based on the list of neighboring cells on the second network, in which the list is configured in the first network cell; before the second network processing module is started, the following is further included:

the first network processing module is triggered to detect whether the dual-standby terminal moves to the first network cell that is not configured with neighboring cells on the second network; if yes, the PS domain is camped on the first network cell where the current dual-mode terminal is located, and the process ends; otherwise, the step of starting the second network processing module continues to be executed.

When the first network is a GSM network and the second network is a 3G network, the control module is specifically configured to:

close the second network processing module after PS domain attach or a route area update of the second network and when no packet data protocol (PDP) activation process is performed in a set duration;

or, close the second network processing module after PDP deactivation and when no PDP activation process is performed in the set duration.

Through this embodiment, the method processes in Embodiment 1 and Embodiment 2 can be performed to improve the service quality and reduce power consumption of the handset.

Embodiment 4

Figure 7:
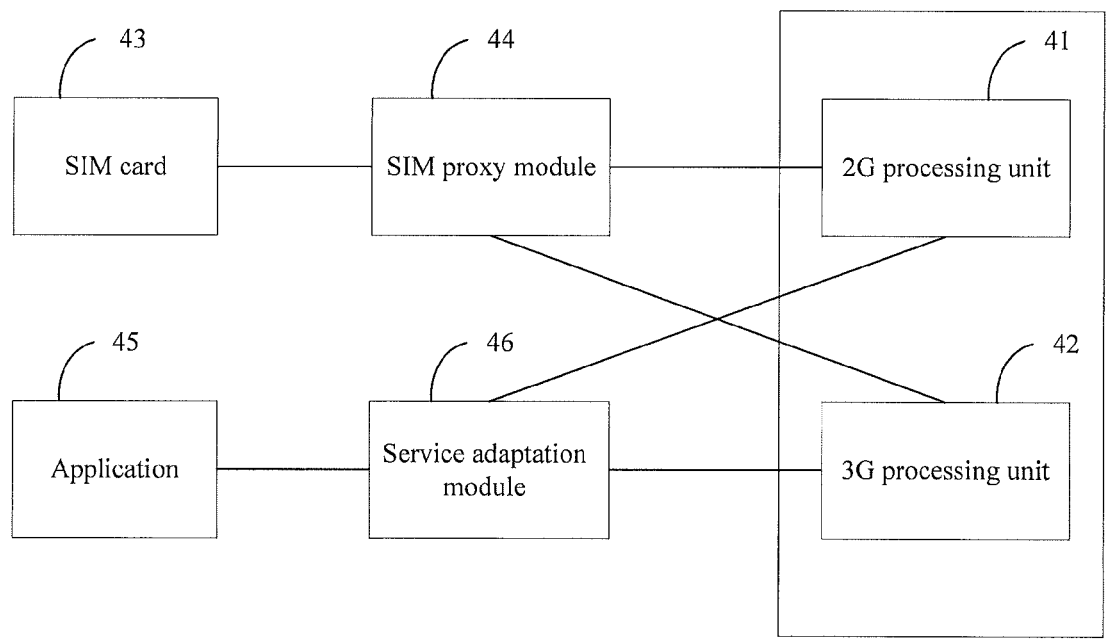
FIG. 7 is a structural schematic diagram of a single-card dual-standby terminal provided in a fourth embodiment of the present invention.
Figure 8:
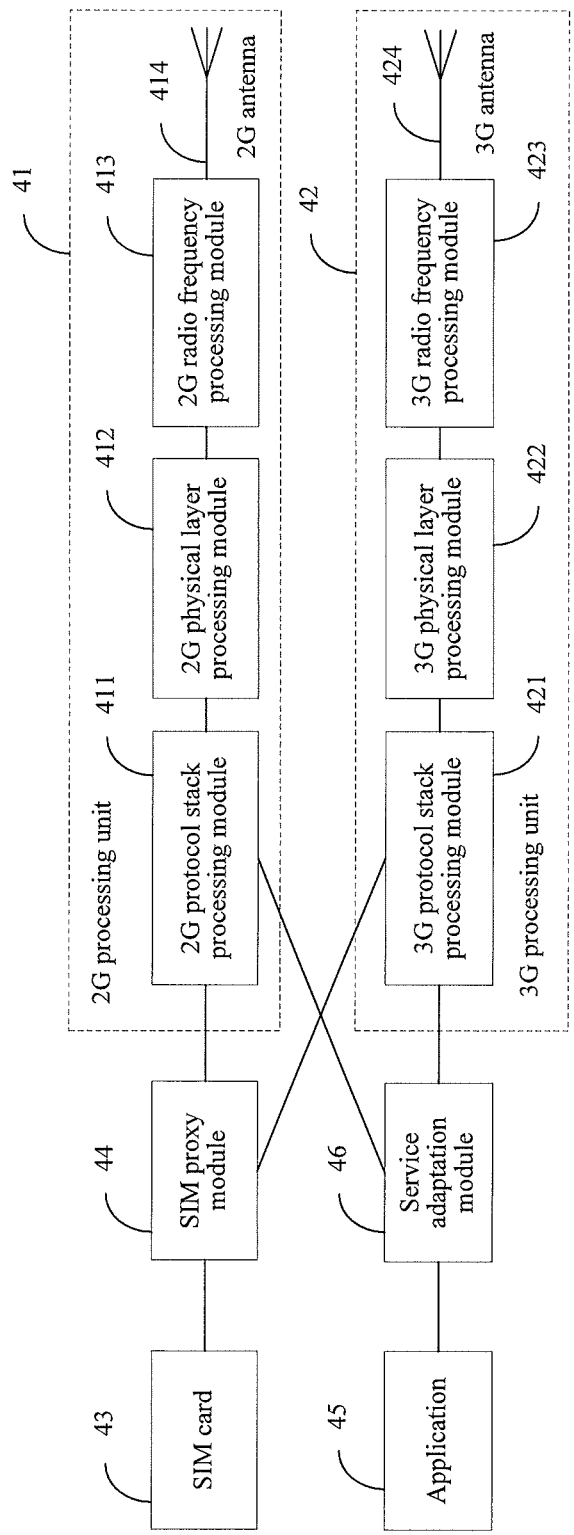
FIG. 8 is another structural schematic diagram of the single-card dual-standby terminal provided in the fourth embodiment of the present invention.

Specifically, based on Embodiment 3, this embodiment provides a single-card dual-standby terminal. Referring to FIG. 7, compared with a single-card dual-standby terminal in the prior art, the single-card dual-standby terminal (taking 2G/3G single-card dual-standby terminal as an example) in this embodiment includes two independent processing units: a 2G processing unit 41 and a 3G processing unit 42, configured to process 2G services and 3G services respectively. Specifically, FIG. 8 shows specific structures of the 2G processing unit and 3G processing unit, where, the 2G processing unit includes a 2G protocol stack processing module 411, a 2G physical layer processing module 412, a 2G radio frequency processing module 413, and a 2G antenna 414; the 3G processing unit includes a 3G protocol stack processing module 421, a 3G physical layer processing module 422, a 3G radio frequency processing module 423, and a 3G antenna 424.

The 2G protocol stack processing module is configured to complete processing of relevant protocols of the 2G network, where these protocols are protocols above the physical layer; the 2G physical layer processing module is configured to complete processing of physical layer data; the 2G radio frequency processing module is configured to complete processing of 2G radio frequency signals; the 2G antenna is configured to transmit and receive signals on the 2G network.

Similar to the sub modules in the 2G processing module, in the 3G processing unit, the 3G protocol stack processing module is configured to complete processing of relevant protocols of the 3G network, where these protocols are protocols above the physical layer; the 3G physical layer processing module is configured to complete processing of physical layer data; the 3G radio frequency processing module is configured to complete processing of 3G radio frequency signals; the 3G antenna is configured to transmit and receive signals on the 3G network.

In addition, similar to a terminal in the prior art, the terminal in this embodiment also includes a SIM card 43, a SIM card proxy module 44, an application 45, and a service adaptation module 46. Functions of each module have been introduced in the Background, and are not described here. It should be noted that in the embodiment, the SIM proxy module and service adaptation module are connected to the 2G protocol stack processing module and 3G protocol stack processing module respectively. The specific connection relationship is changed compared with the prior art, but the basic functions of the SIM proxy module and service adaptation module are not changed, that is, the SIM proxy module is configured to perform the proxy service for different network processing modules to access the SIM card, and the service adaptation module is configured to select a proper protocol stack for transmitting services according to the camp state of the 2G protocol stack processing module and the camp state of 3G protocol stack processing module. In addition, in the present embodiment, the service adaptation module is configured to perform coordination processing for the 2G protocol stack processing module and 3G protocol stack processing module, for example, to coordinate the states of both modules, and notify the status of one module to the other.

It should be noted that certain functions of each of the preceding modules can be separately provided by or integrated into other modules. For example, the coordination function of the service adaptation module can be provided by a separate module, or integrated into the 2G protocol stack processing module or 3G protocol stack processing module. For example, during specific hardware implementation, assuming that the modules (including a protocol stack processing module and a physical layer processing module) that provide 2G functions are implemented by using one chip, and the modules (including a protocol stack processing module and a physical layer processing module) that provide 3G functions are implemented by using another chip. Then the codes that coordinate the states of the both can be compiled on the chip for implementing 2G function modules or the chip for implementing 3G function modules.

The 2G protocol stack processing module in FIG. 8 may correspond to the first network processing module in FIG. 6, the 3G protocol stack processing module in FIG. 8 may correspond to the second network processing module in FIG. 6, and the service adaptation module may correspond to the control module in FIG. 6. The 2G protocol stack processing module, 3G protocol stack processing module, and service adaptation module in this embodiment can be adopted to perform the relevant method processes in Embodiment 1 and Embodiment 2. The details are not provided here.

In addition, this embodiment further provides a dual-card dual-standby terminal, which can be implemented based on an existing dual-card dual-mode terminal. An existing dual-card dual-mode terminal has two independent modules: a 2G module and a 3G module, each of which corresponds to one SIM (USIM) card to work in two modes. Therefore, the solution of camping on two networks and saving the energy can be implemented by adding a camping policy of the dual-card dual-mode terminal and adding a control module. For the specific implementation process, refer to the single-card dual-standby terminal. The process is not described here.

In fact, this embodiment can also be applied to a multi-mode dual-standby terminal. That is, a handset can be set with a plurality of modules and enable the CS domain and PS domain to camp on relevant networks according to factors such as signal quality and data transmission rates of a plurality of networks. For the specific processing method and hardware structure, refer to the processing method and hardware structure of the dual-standby terminal. The details are not provided here.

Those killed in the art can complete all or part of the steps in the preceding method by using a program to instruct the hardware. The program can be stored in a storage medium that can be read by a computer. The procedure for executing the program can include the processes of the methods provided in an embodiment of the present invention. The storage medium can be disk tape, compact disk, read-only memory (ROM, Read-Only Memory), or random access memory (RAM, Random Access Memory).

The preceding exemplary embodiments further describe the purpose, technical solutions, and beneficial effects of the present invention. It can be understood that the invention is not confined to such embodiments of the present invention.

The invention is intended to cover all the modifications, equivalent replacements, and improvements of the invention provided that they fall in the protection scope of the spirit and principles of the invention.

What is claimed is:

1. A method for selecting a network by a terminal, comprising:
enabling, by a first network processing module, a circuit switched (CS) domain to camp on a first network;
enabling, by a second network processing module, a packet switched (PS) domain to camp on a second network;
wherein, signal coverage of the first network is better than that of the second network, and a data transmission rate of the second network is higher than that of the first network.

2. The method according to claim 1, further comprising:
closing the second network processing module when no PS domain service exists in a set duration.

3. The method according to claim 2, after the closing the second network processing module, further comprising:
starting the second network processing module when a PS domain service is initiated.

4. A method for selecting a network by a terminal, comprising:
enabling, by a first network processing module, a circuit switched (CS) domain to camp on a first network;
enabling, by a second network processing module, a packet switched (PS) domain to camp on a second network;
wherein, signal coverage of the first network is better than that of the second network, and a data transmission rate of the second network is higher than that of the first network,
closing the second network processing module when no PS domain service exists in a set duration;
after the closing the second network processing module, further comprising:
starting the second network processing module when a PS domain service is initiated;
after the starting the second network processing module, further comprising:
searching, by the second network processing module, a second network cell that meets a camping requirement; and
triggering the second network processing module to initiate a route area update process, enabling the PS domain to camp on the found second network cell, and executing the PS domain service, when the second network processing module finds the second network cell that meets the camping requirement and a route area of the second network is changed; or
triggering the second network processing module to execute the PS domain service when the second network processing module finds the second network cell that meets the camping requirement and the route area of the second network is not changed; or
triggering the first network networking processing module to enable the PS domain to camp on a first network cell on which a current CS domain service camps, and executing the PS domain service, when the second network processing module finds no second network cell that meets the camping requirement.

5. The method according to claim 4, wherein:
the route area of the second network is changed comprises:
a route area where the found second network cell is located is not consistent with a route area where a previous second network cell is located, wherein the previous second network cell is a cell on which the PS domain camps before the second network processing module is closed; and
the route area of the second network is not changed comprises:
the route area where the found second network cell is located is consistent with the route area where the previous second network cell is located, wherein the previous second network cell is a cell on which the PS domain camps before the second network processing module is closed.

6. The method according to claim 4, wherein the search performed by the second network processing module is based on a list of neighboring cells on the second network, and the list is configured for first network cells, wherein before the staring the second network processing module, further comprising:
triggering the first network processing module to detect whether a first network cell where the terminal is currently located is configured with a neighboring cell on the second network; and
enabling the PS domain to camp on the first network cell where the terminal is currently located, when the first network cell is not configured with a neighboring cell on the second network; or
continuing to execute the step of starting the second network processing module, when the first network cell is configured with a neighboring cell on the second network.

7. The method according to claim 2, wherein, the first network is a GSM network, and the second network is a 3G network, and
the enabling, by a first network processing module, a CS domain to camp on a first network, comprising: initiating a location area update (LAU) process to attach to the 2G network; and
the enabling, by a second network processing module, a PS domain to camp on a second network, comprising: initiating a general packet radio service (GPRS) attach or route area update (RAU) process to attach to the 3G network.

8. The method according to claim 7, after the closing the second network processing module, further comprising:
starting the second network processing module when a preset periodical RAU timer expires or the first network processing module initiates a LAU process when determining that a location area of the first network is changed.

9. The method according to claim 8, after the starting the second network processing module, further comprising:
searching, by the second network processing module, a second network cell that meets a camping requirement after starting the second network processing module; and
triggering the second network processing module to initiate a route area update process, enabling the PS domain to camp on the found second network cell, and executing the PS domain service, when the second network processing module finds the second network cell that meets the camping requirement and a route area of the second network is changed; or
triggering the second network processing module to execute the PS domain service, when the second network processing module finds the second network cell that meets the camping requirement and the route area of the second network is not changed; or triggering the first network networking processing module to enable the PS domain to camp on a first network cell on which a current CS domain service camps, and executing the PS domain service, when the second network processing module finds no second network cell that meets the camping requirement.

10. The method according to claim 9, wherein:
the route area of the second network is changed comprises:
a route area where the found second network cell is located is not consistent with a route area where a previous second network cell is located, wherein the previous second network cell is a cell on which the PS domain camps before the second network processing module is closed; and
the route area of the second network is not changed comprises:
the route area where the found second network cell is located is consistent with the route area where the previous second network cell is located, wherein the previous second network cell is a cell on which the PS domain camps before the second network processing module is closed.

11. The method according to claim 9, wherein the search performed by the second network processing module is based on a list of neighboring cells on the second network, and the list is configured for first network cells, wherein before the staring the second network processing module, further comprising:
triggering the first network processing module to detect whether a first network cell where the terminal is currently located is configured with a neighboring cell on the second network; and
enabling the PS domain to camp on the first network cell where the terminal is currently located, when the first network cell is not configured with a neighboring cell on the second network; or
continuing to execute the step of starting the second network processing module, when the first network cell is configured with a neighboring cell on the second network.

12. A terminal, comprising:
a first network processing module, configured to enable a circuit switched (CS) domain to camp on a first network;
a second network processing module, configured to enable a packet switched (PS) domain to camp on a second network;
wherein, signal coverage of the first network is better than that of the second network, and a data transmission rate of the second network is higher than that of the first network.

13. The terminal according to claim 12, further comprising:
a control module, configured to close the second network processing module when no PS domain service exists in a set duration.

14. The terminal according to claim 13, after the closing the second network processing module, the control module is further configured to:
start the second network processing module when a PS domain service is initiated.

15. The terminal according to claim 14, after the starting the second network processing module, the control module is further configured to:
trigger the second network networking processing module to search a second network cell that meets a camping requirement; and
trigger the second network processing module to initiate a route area update process, enabling the PS domain to camp on the found second network cell, and executing the PS domain service, when the second network processing module finds the second network cell that meets the camping requirement and a route area of the second network is changed; or
trigger the second network processing module to execute the PS domain service when the second network processing module finds the second network cell that meets the camping requirement and the route area of the second network is not changed; or
trigger the first network networking processing module to enable the PS domain to camp on a first network cell on which a current CS domain service camps, and executing the PS domain service, when the second network processing module finds no second network cell that meets the camping requirement.

16. The terminal according to claim 15, wherein:
the route area of the second network is changed comprises:
a route area where the found second network cell is located is not consistent with a route area where a previous second network cell is located, wherein the previous second network cell is a cell on which the PS domain camps before the second network processing module is closed; and
the route area of the second network is not changed comprises:
the route area where the found second network cell is located is consistent with the route area where the previous second network cell is located, wherein the previous second network cell is a cell on which the PS domain camps before the second network processing module is closed.

17. The terminal according to claim 13, wherein, the first network is a GSM network, and the second network is a 3G network, and
the first network processing module is configured to initiate a location area update (LAU) process to attach to the 2G network to enable the CS domain to camp on the first network ; and
the second network processing module is configured to initiate a general packet radio service (GPRS) attach or route area update (RAU) process to attach to the 3G network to enable a PS domain to camp on the second network.

18. The terminal according to claim 17, after the closing the second network processing module, the control module is further configured to:
start the second network processing module when a preset periodical RAU timer expires or the first network processing module initiates a LAU process when determining that a location area of the first network is changed.

19. The terminal according to claim 18, after the starting the second network processing module, the control module is further configured to:
trigger the second network networking processing module to search a second network cell that meets a camping requirement after starting the second network processing module; and
trigger the second network processing module to initiate a route area update process, enabling the PS domain to camp on the found second network cell, and executing the PS domain service, when the second network processing module finds the second network cell that meets the camping requirement and a route area of the second network is changed; or trigger the second network processing module to execute the PS domain service, when the second network processing module finds the second network cell that meets the camping requirement and the route area of the second network is not changed; or trigger the first network networking processing module to enable the PS domain to camp on a first network cell on which a current CS domain service camps, and executing the PS domain service, when the second network processing module finds no second network cell that meets the camping requirement.

20. The terminal according to claim 19, wherein:

the route area of the second network is changed comprises:

a route area where the found second network cell is located is not consistent with a route area where a previous second network cell is located, wherein the previous second network cell is a cell on which the PS domain camps before the second network processing module is closed; and the route area of the second network is not changed comprises:

the route area where the found second network cell is located is consistent with the route area where the previous second network cell is located, wherein the previous second network cell is a cell on which the PS domain camps before the second network processing module is closed.

* * * * *